(12) United States Patent
Liu et al.

(10) Patent No.: US 8,049,828 B2
(45) Date of Patent: Nov. 1, 2011

(54) FLAT-PANEL DISPLAY DEVICE HAVING TEST ARCHITECTURE

(75) Inventors: Chun-Hsin Liu, Hsin-Chu (TW);
Yung-Chih Chen, Hsin-Chu (TW);
Po-Yuan Liu, Hsin-Chu (TW);
Tsung-Ting Tsai, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 737 days.

(21) Appl. No.: 12/178,662

(22) Filed: Jul. 24, 2008

(65) Prior Publication Data

US 2009/0284706 A1 Nov. 19, 2009

(30) Foreign Application Priority Data

May 16, 2008 (TW) .............................. 97118158 A (51) Int. Cl.
*G02F 1/1333* (2006.01)
*G02F 1/1345* (2006.01)

(52) U.S. Cl. ........... 349/40; 349/149; 349/151; 349/152

(58) Field of Classification Search .................... 349/40, 349/54

See application file for complete search history.

(56) References Cited

U.S. PATENT DOCUMENTS

| 5,576,730 | A | 11/1996 | Shimada |
| 6,784,862 | B2 * | 8/2004 | Kodate et al. ................... 345/92 |
| 2005/0057273 | A1 | 3/2005 | Lin |
| 2005/0264503 | A1 | 12/2005 | Wu |

FOREIGN PATENT DOCUMENTS

| JP | 55866 A | 1/1993 |
| JP | 643490 A | 2/1994 |
| JP | 2001235725 A | 8/2001 |

* cited by examiner

*Primary Examiner* — Wen-Ying P Chen
(74) *Attorney, Agent, or Firm* — Winston Hsu; Scott Margo (57) ABSTRACT

A flat-panel display device having test architecture is disclosed for disposing shorting bars without sacrificing wiring-on-array bus layout area of the outer-lead-bonding region. The flat-panel display device essentially includes a substrate having a plurality of driving integrated-circuit (IC) mounting areas, a plurality of signal lines and transmission lines disposed on the substrate, and a plurality of shorting bars disposed on the driving IC mounting areas. Each shorting bar is coupled to a corresponding signal line and a corresponding transmission line. Furthermore, in order to take out the laser-cutting process in the fabrication of the flat-panel display device for saving production cost, each driving IC mounting area is further disposed with a plurality of transistors for controlling the signal connections between the shorting bars and the signal lines, and also for controlling the signal connections between the shorting bars and the transmission lines.

10 Claims, 8 Drawing Sheets

FLAT-PANEL DISPLAY DEVICE HAVING TEST ARCHITECTURE

RELATED APPLICATIONS

This application claims priority to Taiwan Application Serial Number 97118158, filed on May 16, 2008, which is herein incorporated by reference.

BACKGROUND OF THE INVENTION

1. Field of the Invention

The present invention relates to a flat-panel display device, and more particularly, to a flat-panel display device having test architecture.

2. Description of the Prior Art

Among existing display devices, the flat-panel display devices have gained utmost popularity. Furthermore, among the flat-panel display devices, the liquid crystal display (LCD) devices are widely applied in various electronic products such as computer monitors, mobile phones, personal digital assistants (PDAs), or flat-panel televisions due to thin appearance, low power consumption, and low radiation. In general, the LCD device comprises liquid crystal cells encapsulated between two substrates and a backlight module for providing a light source. The operation of an LCD device is featured by varying voltage drops between opposite sides of the liquid crystal cells for twisting the angles of the liquid crystal molecules of the liquid crystal cells so that the transparency of the liquid crystal cells can be controlled for illustrating images with the aid of the backlight module.

Figure 1:
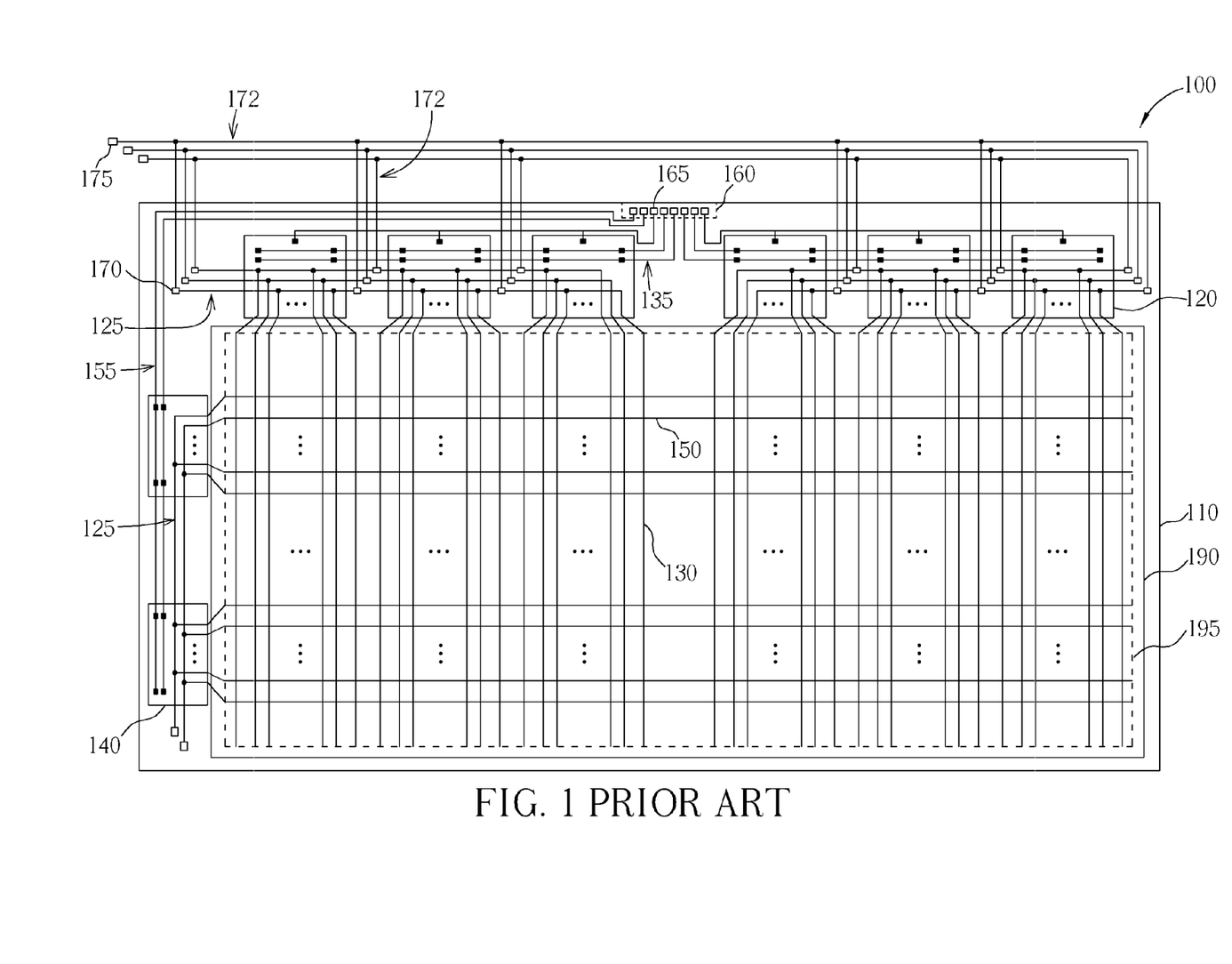
FIG. 1 is a schematic diagram showing a prior-art flat-panel display device having test architecture.

FIG. 1 is a schematic diagram showing a prior-art flat-panel display device having test architecture. As shown in FIG. 1, the flat-panel display device 100 comprises a bottom substrate 110, a top substrate 190 positioned on top of the bottom substrate 110, and a plurality of liquid crystal cells (not shown) encapsulated between the bottom substrate 110 and the top substrate 190. The top substrate 190 is a color filter for displaying color images of the flat-panel display device 100. The bottom substrate 110 comprises a bonding area 160 for attaching a flexible printed circuit board (not shown), a plurality of source driving integrated circuit (IC) mounting areas 120, a plurality of gate driving IC mounting areas 140, a plurality of data lines 130, a plurality of gate lines 150, a plurality of shorting bars 125, a horizontal bus 135, a vertical bus 155, and an image display area 195. The bonding area 160 comprises a plurality of bonding pads 165. Each bonding pad 165 is coupled to one horizontal transmission line of the horizontal bus 135 or one vertical transmission line of the vertical bus 155. The source driving IC mounting areas 120 and the gate driving IC mounting areas 140 are utilized for installing source driving ICs (not shown) and gate driving ICs (not shown) respectively. The horizontal bus 135 and the vertical bus 155 are disposed on the outer-lead-bonding (OLB) area of the bottom substrate 110 based on a wiring-on-array (WOA) arrangement.

In general, before the source driving ICs and the gate driving ICs are mounted respectively on the source driving IC mounting areas 120 and the gate driving IC mounting areas 140, an array test and a cell test are performed on the flat-panel display device 100 in order to check in advance whether any array wiring defect or any abnormal cell color display exists. Accordingly, the bottom substrate 110 is further disposed with a plurality of internal test pads 170 coupled to the shorting bars 125 for performing the array test and the cell test. The internal test pads 170 are further coupled to a plurality of external test pads 175 via a plurality of test signal transmission lines 172. As shown in FIG. 1, the test signal transmission lines 172 are crossed with the vertical bus 155 and parts of the horizontal transmission lines of the horizontal bus 135. For that reason, cross short-circuit defects are likely to occur at the intersections of the test signal transmission lines 172 and other related transmission lines, and therefore the circuit operation of the wiring-on-array may not function correctly due to the cross short-circuit defects. Furthermore, since the plurality of internal test pads 170 are disposed on the outer-lead-bonding area, the area available for disposing the vertical bus 155 and horizontal bus 135 is then reduced, which will increase wiring impedance and degrade signal transmission performance.

Figure 2:
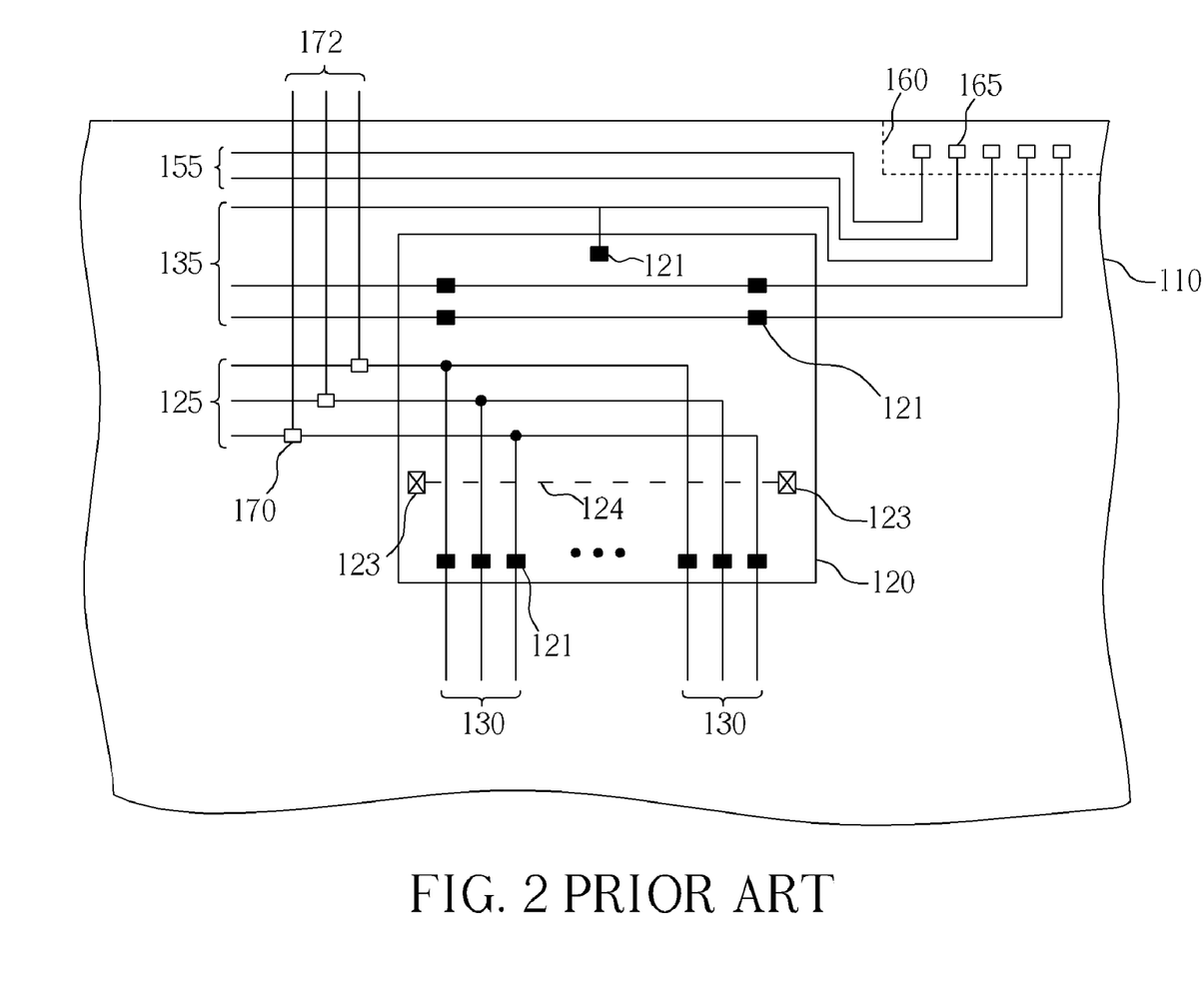
FIG. 2 is a schematic diagram showing the internal layout of the source driving IC mounting area in FIG. 1.

FIG. 2 is a schematic diagram showing the internal layout of the source driving IC mounting area in FIG. 1. As shown in FIG. 2, the source driving IC mounting area 120 is disposed with a plurality of connection pads 121 and at least two align marks 123. After finishing the array test and the cell test, a laser-cutting process is performed for cutting off the connections between the shorting bars 125 and the data lines 130 along the dotted line 124 with the aid of the align marks 123 to level the cutting position. The internal layout of the gate driving IC mounting area 140 is similar to the internal layout of the source driving IC mounting area 120, and for sake of brevity, further similar description is omitted. The source driving ICs and the gate driving ICs can be mounted respectively on the source driving IC mounting areas 120 and the gate driving IC mounting areas 140 only after finishing the laser-cutting process. However, while performing the laser-cutting process, lots of particles will come out and contaminate the bottom substrate 110 under processing, which may result in low product yields. Besides, the production cost of the prior-art flat-panel display devices is high following the requirement of the laser-cutting machine for performing the laser-cutting process.

SUMMARY OF THE INVENTION

In accordance with an embodiment of the present invention, a flat-panel display device having test architecture is disclosed. The flat-panel display device comprises a substrate, a plurality of parallel signal lines, a plurality of transmission lines, and a plurality of shorting bars. The substrate comprises a plurality of driving IC mounting areas. The signal lines and the transmission lines are disposed on the substrate. Each of the shorting bars is disposed on a corresponding driving IC mounting area of the driving IC mounting areas. Each of the shorting bars is coupled to a corresponding signal line of the signal lines and a corresponding transmission line of the transmission lines.

In accordance with another embodiment of the present invention, a flat-panel display device having test architecture is disclosed. The flat-panel display device comprises a substrate, a plurality of transmission lines, a plurality of parallel signal lines, a plurality of shorting bars, and a plurality of transistors. The substrate comprises a bonding area for attaching a flexible printed circuit board. The bonding area comprises a plurality of bonding pads. The transmission lines, the gate lines and the shorting bars are disposed on the substrate. Each of the transmission lines is coupled to a corresponding bonding pad of the bonding pads. The transistors are disposed on the substrate. Each of the transistors comprises a first end coupled to a corresponding shorting bar of the shorting bars, a second end coupled to a corresponding signal line of the signal lines, and a gate coupled to a test enable signal transmission line. The test enable signal transmission line is a corresponding transmission line of the transmission lines or a corresponding shorting bar of the shorting bars.

These and other objectives of the present invention will no doubt become obvious to those of ordinary skill in the art after reading the following detailed description of the preferred embodiment that is illustrated in the various figures and drawings.

DETAILED DESCRIPTION

Hereinafter, preferred embodiments of the present invention will be described in detail with reference to the accompanying drawings. Here, it is to be noted that the present invention is not limited thereto.

Figure 3:
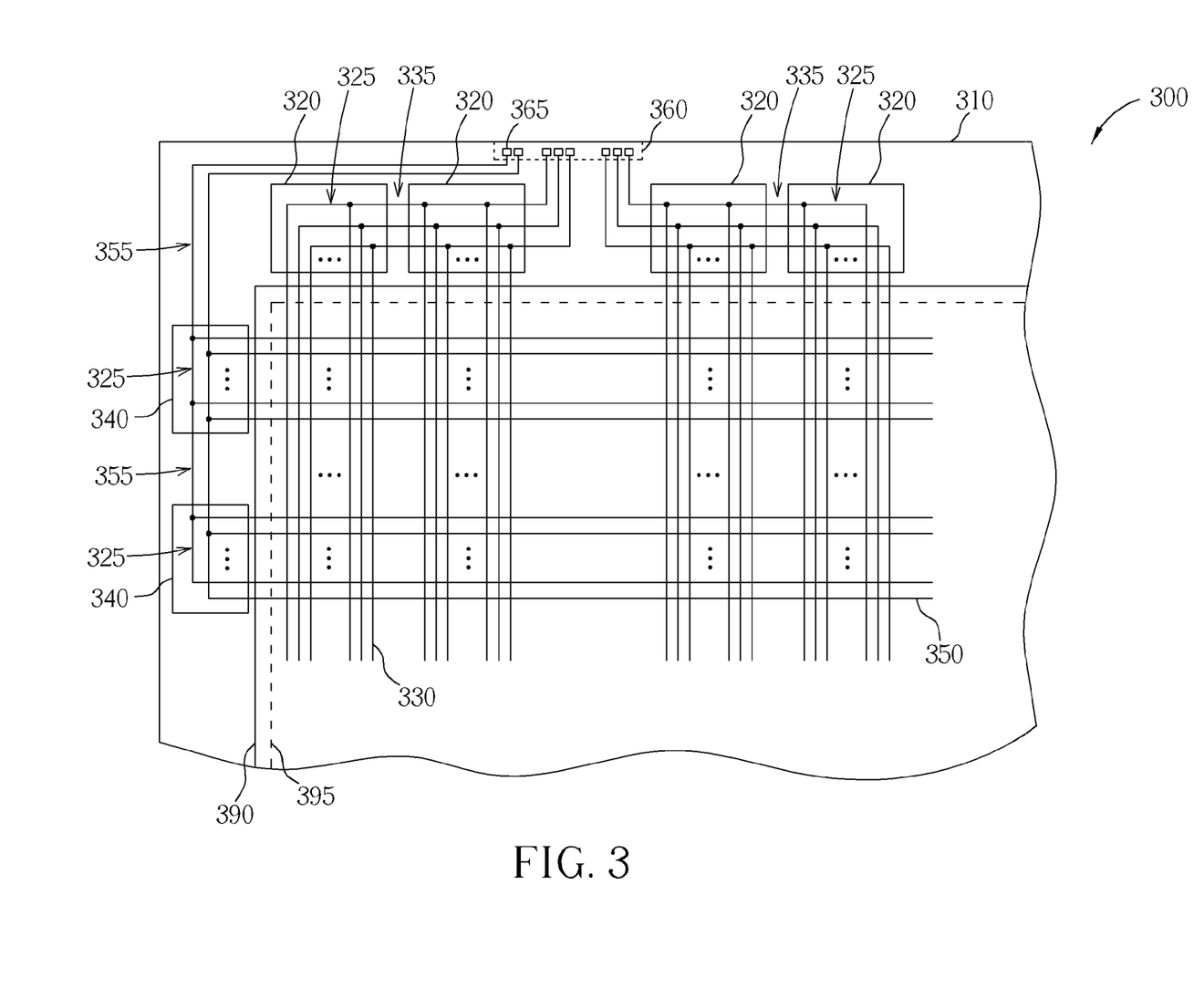
FIG. 3 is a schematic diagram showing a flat-panel display device having test architecture in accordance with a first embodiment of the present invention.

FIG. 3 is a schematic diagram showing a flat-panel display device having test architecture in accordance with a first embodiment of the present invention. As shown in FIG. 3, the flat-panel display device 300 comprises a bottom substrate 310, a top substrate 390 positioned on top of the bottom substrate 310, and a liquid crystal layer (not shown) encapsulated between the bottom substrate 310 and the top substrate 390. The top substrate 390 is a color filter for displaying color images of the flat-panel display device 300. The bottom substrate 310 comprises a bonding area 360 for attaching a flexible printed circuit board (not shown), a plurality of source driving IC mounting areas 320, a plurality of gate driving IC mounting areas 340, a plurality of data lines 330, a plurality of gate lines 350, a plurality of shorting bars 325, a horizontal bus 335, a vertical bus 355, and an image display area 395. The data lines 330 and the gate lines 350 are crossed with each other and disposed on the image display area 395 for transferring data signals and gate signals for displaying images.

The bonding area 360 comprises a plurality of bonding pads 365. The horizontal bus 335 comprises a plurality of horizontal transmission lines, and each horizontal transmission line is coupled to one corresponding bonding pad 365. Also, the vertical bus 355 comprises a plurality of vertical transmission lines, and each vertical transmission line is coupled to one corresponding bonding pad 365. The source driving IC mounting areas 320 and the gate driving IC mounting areas 340 are utilized for installing source driving ICs (not shown) and gate driving ICs (not shown) respectively. The horizontal bus 335 and the vertical bus 355 are disposed on the outer-lead-bonding area of the bottom substrate 310 based on a wiring-on-array arrangement.

Each shorting bar 325 is disposed on one corresponding source driving IC mounting area 320 or one corresponding gate driving IC mounting area 340. The shorting bar 325 disposed on the source driving IC mounting area 320 is coupled to one corresponding data line 330 and one corresponding horizontal transmission line of the horizontal bus 335. The shorting bar 325 disposed on the gate driving IC mounting area 340 is coupled to one corresponding gate line 350 and one corresponding vertical transmission line of the vertical bus 355. While performing the array test or the cell test regarding the flat-panel display device 300, a plurality of first test signals and a plurality of second test signals are furnished respectively into the corresponding data lines 330 and the corresponding gate lines 350 for checking in advance whether any array wiring defect or any abnormal display exists. That is, in the operation of the array test or the cell test regarding the flat-panel display device 300, the first test signals are furnished into the corresponding data lines 330 via the corresponding bonding pads 365, the corresponding horizontal transmission lines of the horizontal bus 335 and the shorting bars 325 disposed on the source driving IC mounting areas 320. Furthermore, the second test signals are furnished into the corresponding gate lines 350 via the corresponding bonding pads 365, the corresponding vertical transmission lines of the vertical bus 355 and the shorting bars 325 disposed on the gate driving IC mounting areas 340.

Compared with the prior-art flat-panel display device 100, the internal test pads, the external test pads and the test signal transmission lines are not required in the flat-panel display device 300 of the present invention. Consequently, the aforementioned cross short-circuit defects can be avoided in that no wiring cross arrangement between the test signal transmission line and the related transmission line of the horizontal or vertical bus exists in the layout of the flat-panel display device 300. Moreover, since the internal test pads are not required to be disposed on the outer-lead-bonding area, the area available for disposing the vertical and horizontal buses is not reduced, and high signal transmission performance can be achieved based on low wiring impedance.

Figure 4:
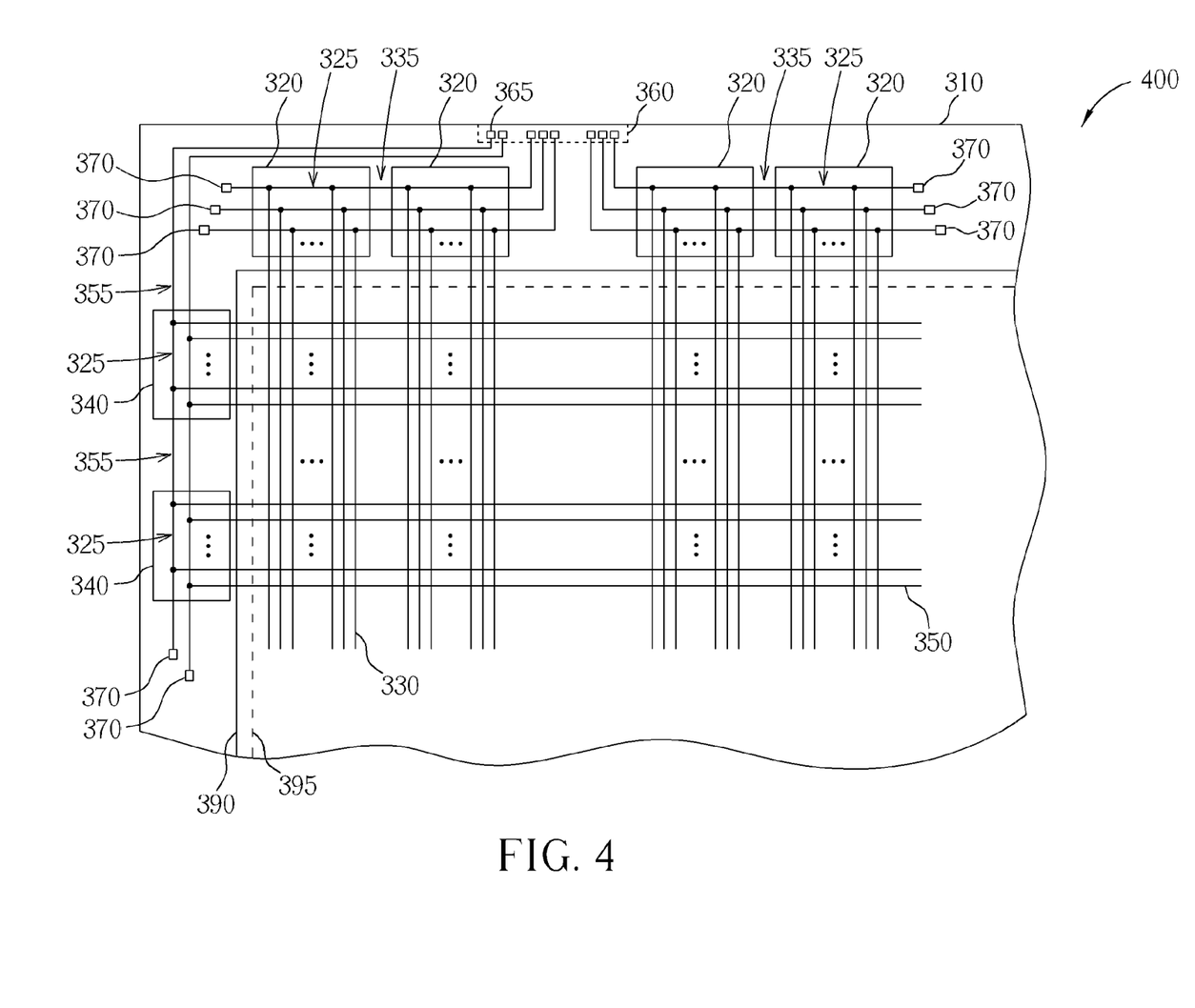
FIG. 4 is a schematic diagram showing a flat-panel display device having test architecture in accordance with a second embodiment of the present invention.

FIG. 4 is a schematic diagram showing a flat-panel display device having test architecture in accordance with a second embodiment of the present invention. As shown in FIG. 4, the layout of the flat-panel display device 400 is similar to the layout of the flat-panel display device 300 shown in FIG. 3, differing only in that the bottom substrate 310 is further disposed with a plurality of test pads 370. Each shorting bar 325 disposed on the source driving IC mounting area 320 is coupled between one corresponding bonding pad 365 and one corresponding test pad 370. Also, each shorting bar 325 disposed on the gate driving IC mounting area 340 is coupled between one corresponding bonding pad 365 and one corresponding test pad 370.

Accordingly, in the operation of the array test or the cell test regarding the flat-panel display device 400, the first test signals and the second test signals can be further inputted from the corresponding test pads 370 using a plurality of probes. That is, each test signal is furnished into one corresponding shorting bar 325 from both ends of the shorting bar 325 so that higher test signal transmission performance for performing accurate tests can be achieved following the lower decay of test signals. Compared with the prior-art flat-panel display device 100, only few test pads 370 are disposed on the bottom substrate 310 of the flat-panel display device 400, and therefore the area available for disposing the vertical and horizontal buses is not reduced significantly so that high signal transmission performance can be achieved as well. The other layout of the flat-panel display device 400 is identical to the layout of the flat-panel display device 300, and for the sake of brevity, further discussion on the other layout of the flat-panel display device 400 is omitted.

Figure 5:
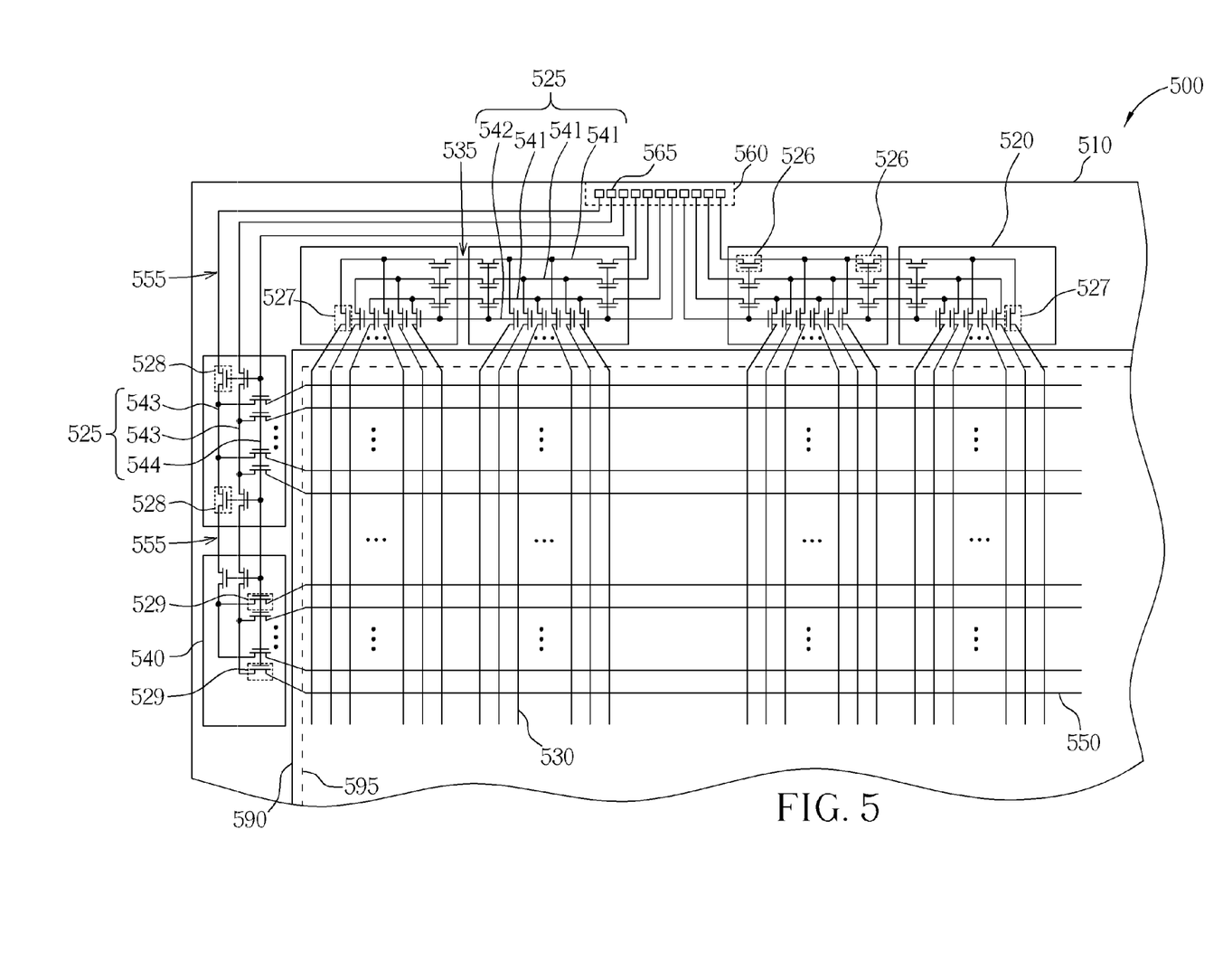
FIG. 5 is a schematic diagram showing a flat-panel display device having test architecture in accordance with a third embodiment of the present invention.

FIG. 5 is a schematic diagram showing a flat-panel display device having test architecture in accordance with a third embodiment of the present invention. As shown in FIG. 5, the flat-panel display device 500 comprises a bottom substrate 510, a top substrate 590 positioned on top of the bottom substrate 510, and a liquid crystal layer (not shown) encapsulated between the bottom substrate 510 and the top substrate 590. The top substrate 590 is a color filter for displaying color images of the flat-panel display device 500. The bottom substrate 510 comprises a bonding area 560 for attaching a flexible printed circuit board (not shown), a plurality of source driving IC mounting areas 520, a plurality of first transistors 526, a plurality of second transistors 527, a plurality of gate driving IC mounting areas 540, a plurality of third transistors 528, a plurality of fourth transistors 529, a plurality of data lines 530, a plurality of gate lines 550, a plurality of shorting bars 525, a horizontal bus 535, a vertical bus 555, and an image display area 595. The data lines 530 and the gate lines 550 are crossed with each other and disposed on the image display area 595 for transferring data signals and gate signals for displaying images.

The bonding area 560 comprises a plurality of bonding pads 565. The horizontal bus 535 comprises a plurality of horizontal transmission lines, and each horizontal transmission line is coupled to one corresponding bonding pad 565. Also, the vertical bus 555 comprises a plurality of vertical transmission lines, and each vertical transmission line is coupled to one corresponding bonding pad 565. The source driving IC mounting areas 520 and the gate driving IC mounting areas 540 are utilized for installing source driving ICs (not shown) and gate driving ICs (not shown) respectively. The horizontal bus 535 and the vertical bus 555 are disposed on the outer-lead-bonding area of the bottom substrate 510 based on a wiring-on-array arrangement.

Each source driving IC mounting area 520 is disposed with a plurality of corresponding shorting bars 525, a plurality of corresponding first transistor 526, and a plurality of corresponding second transistors 527. The shorting bars 525 in each source driving IC mounting area 520 comprise a plurality of first shorting bars 541 and a second shorting bar 542. Each first transistor 526 comprises a first end coupled to one corresponding first shorting bar 541, a second end coupled to one corresponding horizontal transmission line of the horizontal bus 535, and a gate coupled to the second shorting bar 542. Each second transistor 527 comprises a first end coupled to one corresponding first shorting bar 541, a second end coupled to one corresponding data line 530, and a gate coupled to the second shorting bar 542. It is noted that the plurality of source driving IC mounting areas 520 are cascaded via the horizontal bus 535. Except for the last-cascaded source driving IC mounting area 520, both sides of the other source driving IC mounting areas 520 are disposed with a plurality of corresponding first transistors 526. Only one side of the last-cascaded source driving IC mounting area 520 is disposed with a plurality of corresponding first transistors 526 for coupling the penultimate-cascaded source driving IC mounting area 520.

Each gate driving IC mounting area 540 is disposed with a plurality of corresponding shorting bars 525, a plurality of corresponding third transistor 528, and a plurality of corresponding fourth transistors 529. The shorting bars 525 in each gate driving IC mounting area 540 comprise a plurality of third shorting bars 543 and a fourth shorting bar 544. Each third transistor 528 comprises a first end coupled to one corresponding third shorting bar 543, a second end coupled to one corresponding vertical transmission line of the vertical bus 555, and a gate coupled to the fourth shorting bar 544. Each fourth transistor 529 comprises a first end coupled to one corresponding third shorting bar 543, a second end coupled to one corresponding gate line 550, and a gate coupled to the fourth shorting bar 544. It is noted that the plurality of gate driving IC mounting areas 540 are cascaded via the vertical bus 555. Except for the last-cascaded gate driving IC mounting area 540, both sides of the other gate driving IC mounting areas 540 are disposed with a plurality of corresponding third transistors 528. Only one side of the last-cascaded gate driving IC mounting area 540 is disposed with a plurality of corresponding third transistors 528 for coupling the penultimate-cascaded gate driving IC mounting area 540.

While performing the array test or the cell test regarding the flat-panel display device 500, a plurality of first test signals and a plurality of second test signals are furnished respectively into the corresponding data lines 530 and the corresponding gate lines 550 for checking in advance whether any array wiring defect or any abnormal display exists. That is, in the operation of the array test or the cell test regarding the flat-panel display device 500, the first test signals are furnished into the corresponding data lines 530 via the corresponding bonding pads 565, the corresponding horizontal transmission lines of the horizontal bus 535, the corresponding first transistors 526, the corresponding first shorting bars 541, and the corresponding second transistors 527. Besides, a first test enable signal is required for enabling the transmission of the first test signals by turning on the first transistors 526 and the second transistors 527 during the array test or the cell test. The first test enable signal is furnished to the gates of the first transistors 526 and the gates of the second transistors 527 via one corresponding bonding pad 565, one corresponding horizontal transmission line of the horizontal bus 535, and the second shorting bar 542.

Furthermore, in the operation of the array test or the cell test regarding the flat-panel display device 500, the second test signals are furnished into the corresponding gate lines 550 via the corresponding bonding pads 565, the corresponding vertical transmission lines of the vertical bus 555, the corresponding third transistors 528, the corresponding third shorting bars 543, and the corresponding fourth transistors 529. Besides, a second test enable signal is required for enabling the transmission of the second test signals by turning on the third transistors 528 and the fourth transistors 529 during the array test or the cell test. The second test enable signal is furnished to the gates of the third transistors 528 and the gates of the fourth transistors 529 via one corresponding bonding pad 565, one corresponding vertical transmission line of the vertical bus 555, and the fourth shorting bar 544. The second test enable signal can be substantially the same as the first test enable signal.

A plurality of source driving ICs and a plurality of gate driving ICs are attached for performing image display operations after finishing the array test and the cell test, and the first test enable signal is then disabled for turning off the first transistors 526 and the second transistors 527 for disabling the signal connections between the first shorting bars 541 and the data lines 530. Furthermore, the second test enable signal is also disabled for turning off the third transistors 528 and the fourth transistors 529 for disabling the signal connections between the third shorting bars 543 and the gate lines 550. Accordingly, the flat-panel display device 500 is able to perform image display operations correctly regardless of the existing of the first shorting bars 541 and the third shorting bars 543.

That is, in the fabrication of the flat-panel display device 500, the laser-cutting process for cutting off related connections concerning shorting bars by the laser-cutting machine can be omitted, and the particle contamination caused by the laser-cutting process can be avoided for achieving high product yields. Besides, without the requirement of the laser-cutting machine, the production cost of the flat-panel display device 500 can be cut down significantly. Moreover, since the internal test pads, the external test pads and the test signal transmission lines are not required in the flat-panel display device 500, the aforementioned cross short-circuit defects can be avoided and high signal transmission performance can be achieved.

Figure 6:
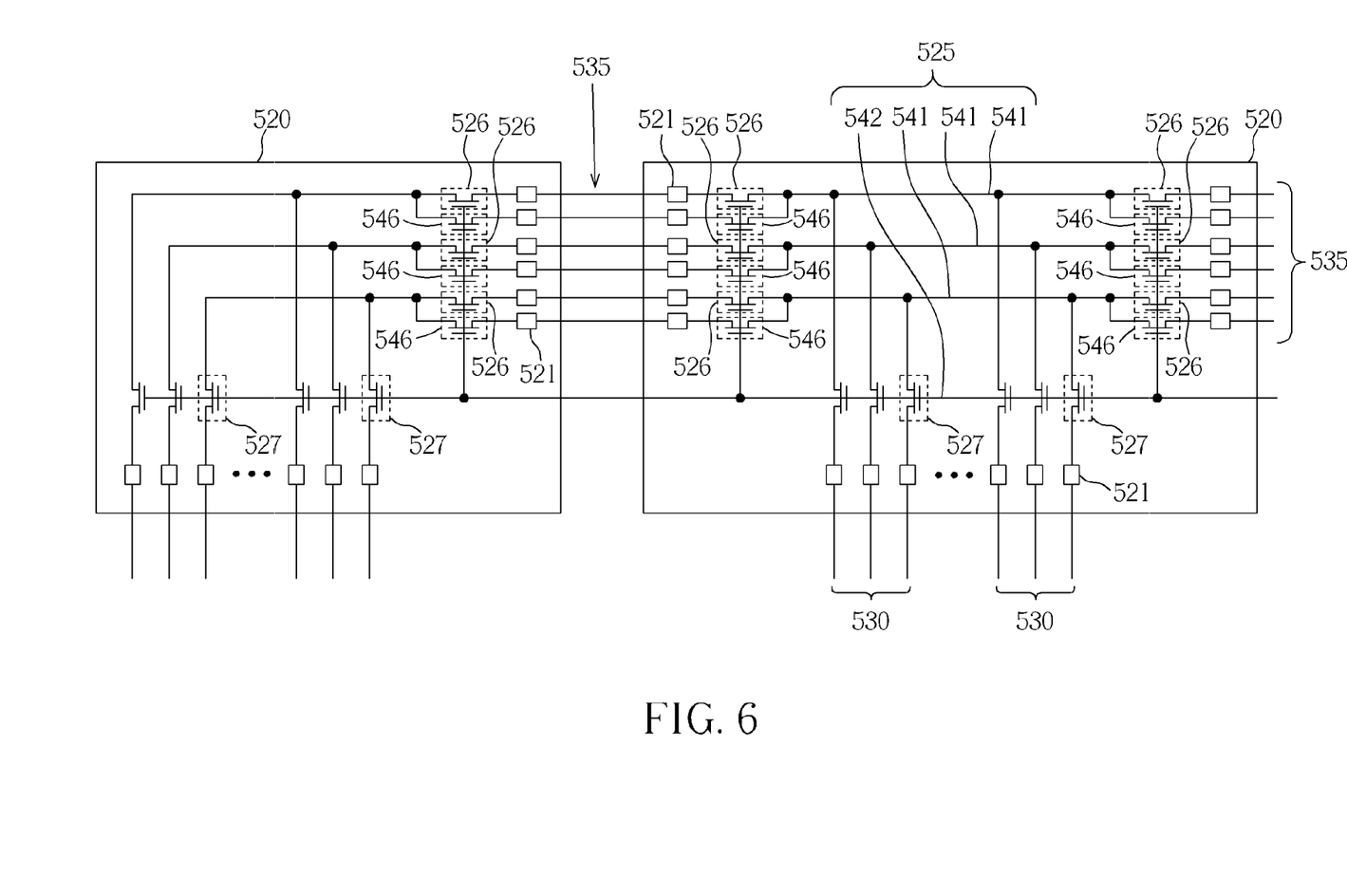
FIG. 6 is a schematic diagram showing the internal layout of the source driving IC mounting area of the flat-panel display device in FIG. 5 in accordance with another embodiment of the present invention.

In another embodiment, the internal layout of the source driving IC mounting area 520 of the flat-panel display device 500 shown in FIG. 5 can be replaced with the internal layout shown in FIG. 6. Please refer to FIG. 6, which is a schematic diagram showing the internal layout of the source driving IC mounting area of the flat-panel display device in FIG. 5 in accordance with another embodiment of the present invention. As shown in FIG. 6, the source driving IC mounting area 520 is disposed with a plurality of first transistors 526, a plurality of second transistors 527, a plurality of first shorting bars 541, a second shorting bar 542, a plurality of fifth transistors 546, and a plurality of connection pads 521. Parts of the connection pads 521 are utilized for coupling the source driving IC with a plurality of corresponding horizontal transmission lines of the horizontal bus 535. Other parts of the connection pads 521 are utilized for coupling the source driving IC with a plurality of corresponding data lines 530. The coupling relationships of the first transistors 526 and the second transistors 527 are the same as the aforementioned coupling relationships in the flat-panel display device 500. Each fifth transistor 546 comprises a first end coupled to the first end of one corresponding first transistor 526, a second end coupled to one corresponding horizontal transmission line of the horizontal bus 535, and a gate coupled to the second shorting bar 542. Similarly, equivalent replacement of the internal layout of the gate driving IC mounting area 540 can also be made with reference to the replacement of the internal layout of the source driving IC mounting area 520.

In the embodiment shown in FIG. 6, while performing the array test or the cell test, each first shorting bar 541 is coupled to two corresponding horizontal transmission lines of the horizontal bus 535. Consequently, each first test signal can be furnished into one corresponding first shorting bar 541 via two corresponding horizontal transmission lines for having lower test signal decay. In another equivalent embodiment, while performing the array test or the cell test, each first shorting bar 541 is coupled to a plurality of corresponding horizontal transmission lines of the horizontal bus 535. That is, each first test signal can be furnished into one corresponding first shorting bar 541 via the plurality of corresponding horizontal transmission lines for having lower test signal decay.

Figure 7:
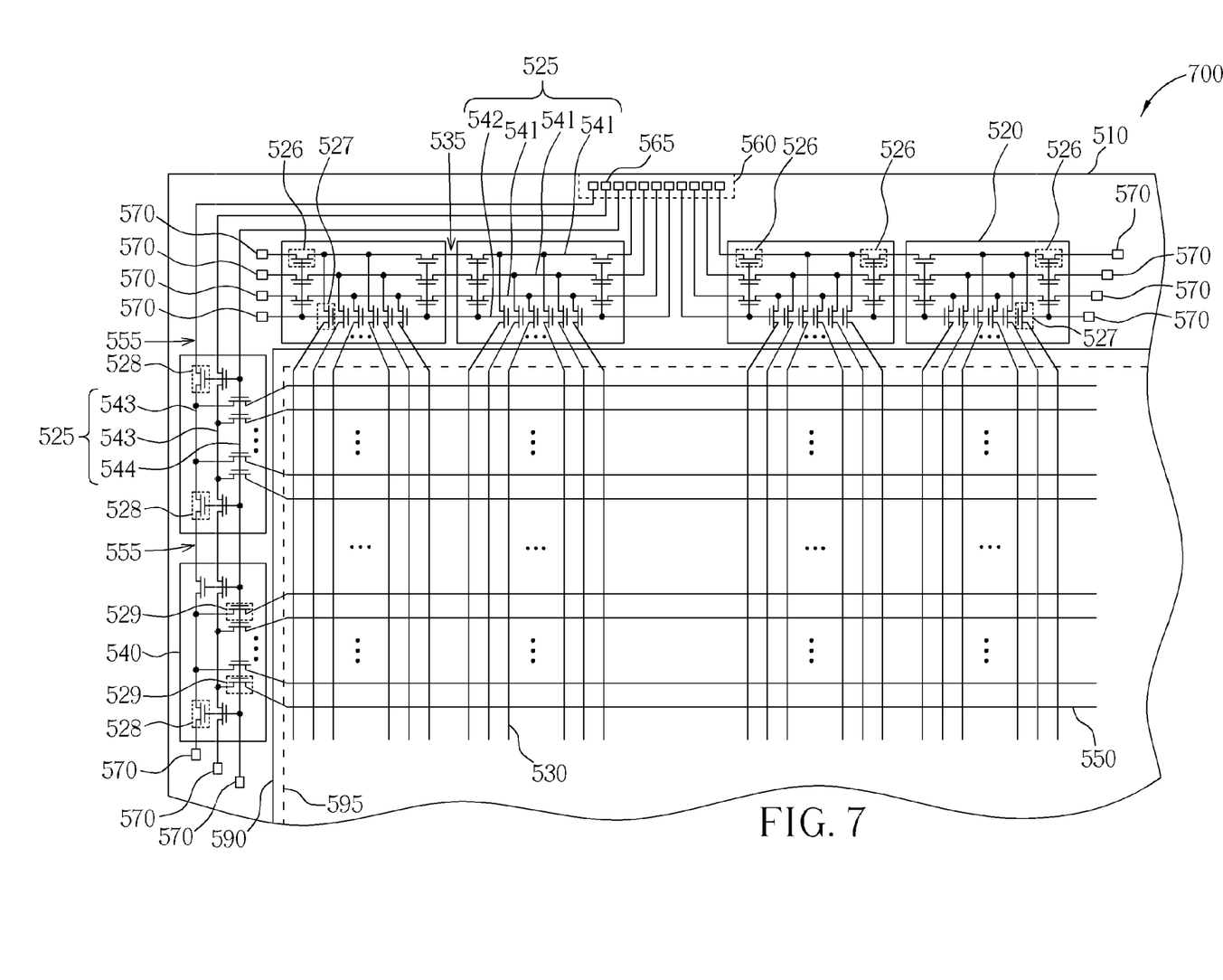
FIG. 7 is a schematic diagram showing a flat-panel display device having test architecture in accordance with a fourth embodiment of the present invention.

FIG. 7 is a schematic diagram showing a flat-panel display device having test architecture in accordance with a fourth embodiment of the present invention. As shown in FIG. 7, the layout of the flat-panel display device 700 is similar to the layout of the flat-panel display device 500 shown in FIG. 5, differing in that the bottom substrate 510 is further disposed with a plurality of test pads 570. Each shorting bar 525 disposed on the source driving IC mounting area 520 is coupled between one corresponding bonding pad 565 and one corresponding test pad 570. Also, each shorting bar 525 disposed on the gate driving IC mounting area 540 is coupled between one corresponding bonding pad 565 and one corresponding test pad 570. Furthermore, as shown in FIG. 7, both sides of the last-cascaded source driving IC mounting area 520 are disposed with a plurality of corresponding first transistors 526 as the other source driving IC mounting areas 520. Also, both sides of the last-cascaded gate driving IC mounting area 540 are disposed with a plurality of corresponding third transistors 528 as the other gate driving IC mounting areas 540.

Accordingly, in the operation of the array test or the cell test regarding the flat-panel display device 700, the first test signals and the second test signals can be further inputted from the corresponding test pads 570 using a plurality of probes. That is, each test signal is furnished into one corresponding shorting bar 525 from both ends of the shorting bar 525 so that higher test signal transmission performance for performing accurate tests can be achieved following the lower decay of test signals.

Compared with the prior-art flat-panel display device 100, only few test pads 570 are disposed on the bottom substrate 510 of the flat-panel display device 700, and therefore the area available for disposing the vertical and horizontal buses is not reduced significantly so that high signal transmission performance can be achieved as well. The other layout of the flat-panel display device 700 is identical to the layout of the flat-panel display device 500, and for the sake of brevity, further discussion on the other layout of the flat-panel display device 700 is omitted.

Figure 8:
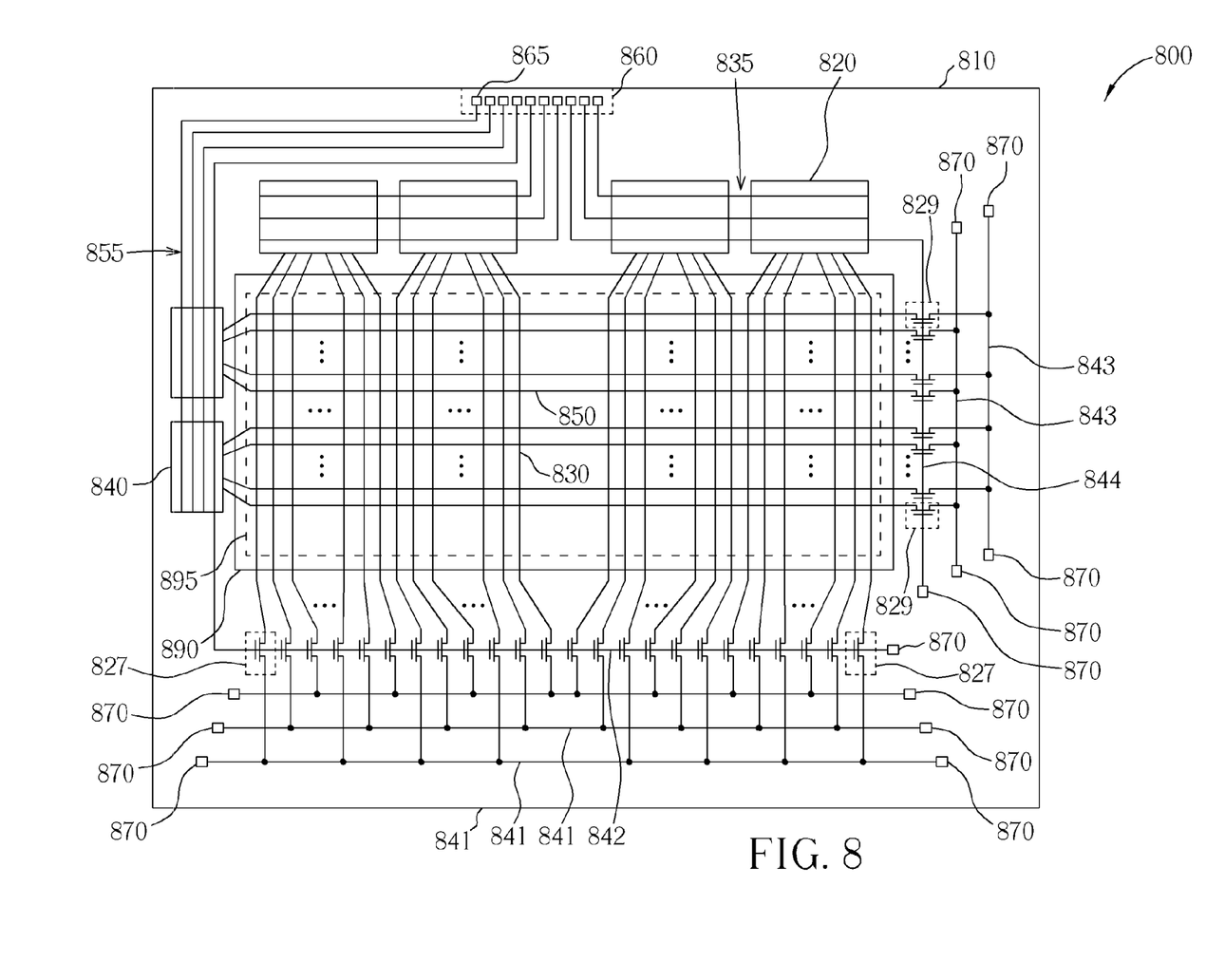
FIG. 8 is a schematic diagram showing a flat-panel display device having test architecture in accordance with a fifth embodiment of the present invention.

FIG. 8 is a schematic diagram showing a flat-panel display device having test architecture in accordance with a fifth embodiment of the present invention. As shown in FIG. 8, the flat-panel display device 800 comprises a bottom substrate 810, a top substrate 890 positioned on top of the bottom substrate 810, and a liquid crystal layer (not shown) encapsulated between the bottom substrate 810 and the top substrate 890. The top substrate 890 is a color filter for displaying color images of the flat-panel display device 800. The bottom substrate 810 comprises a bonding area 860 for attaching a flexible printed circuit board (not shown), a plurality of source driving IC mounting areas 820, a plurality of first transistors 827, a plurality of second transistors 829, a plurality of gate driving IC mounting areas 840, a plurality of data lines 830, a plurality of gate lines 850, a plurality of first shorting bars 841, a second shorting bar 842, a plurality of third shorting bar 843, a fourth shorting bar 844, a plurality of test pads 870, a horizontal bus 835, a vertical bus 855, and an image display area 895. The data lines 830 and the gate lines 850 are crossed with each other and disposed on the image display area 895 for transferring data signals and gate signals for displaying images.

The bonding area 860 comprises a plurality of bonding pads 865. The horizontal bus 835 comprises a plurality of horizontal transmission lines, and each horizontal transmission line is coupled to one corresponding bonding pad 865. Also, the vertical bus 855 comprises a plurality of vertical transmission lines, and each vertical transmission line is coupled to one corresponding bonding pad 865. The source driving IC mounting areas 820 and the gate driving IC mounting areas 840 are utilized for installing source driving ICs (not shown) and gate driving ICs (not shown) respectively. The horizontal bus 835 and the vertical bus 855 are disposed on the outer-lead-bonding area of the bottom substrate 810 based on a wiring-on-array arrangement.

Each first transistor 827 comprises a first end coupled to one corresponding first shorting bar 841, a second end coupled to one corresponding data line 830, and a gate coupled to the second shorting bar 842. Each second transistor 829 comprises a first end coupled to one corresponding third shorting bar 843, a second end coupled to one corresponding gate line 850, and a gate coupled to the fourth shorting bar 844. Opposite ends of each first shorting bar 841 are coupled to corresponding test pads 870 for receiving one of the first test signals. Also, opposite ends of each third shorting bar 843 are coupled to corresponding test pads 870 for receiving one of the second test signals.

The second shorting bar 842 comprises a first end and a second end. The first end of the second shorting bar 842 is coupled directly to one corresponding test pad 870 for receiving a first test enable signal. The second end of the second shorting bar 842 is coupled to one corresponding bonding pad 865 via one corresponding vertical transmission line of the vertical bus 855. That is, the second end of the second shorting bar 842 is coupled to one corresponding vertical transmission line disposed on corresponding gate driving IC mounting areas 840 for receiving the first test enable signal furnished to the corresponding bonding pad 865. In other words, the second shorting bar 842 in conjunction with one corresponding vertical transmission line functions as a test enable signal transmission line for transferring the first test enable signal to the gates of the first transistors 827.

The fourth shorting bar 844 comprises a first end and a second end. The first end of the fourth shorting bar 844 is coupled directly to one corresponding test pad 870 for receiving a second test enable signal. The second end of the fourth shorting bar 844 is coupled to one corresponding bonding pad 865 via one corresponding horizontal transmission line of the horizontal bus 835. That is, the second end of the fourth shorting bar 844 is coupled to one corresponding horizontal transmission line disposed on corresponding source driving IC mounting areas 820 for receiving the second test enable signal furnished to the corresponding bonding pad 865. In other words, the fourth shorting bar 844 in conjunction with one corresponding horizontal transmission line functions as another test enable signal transmission line for transferring the second test enable signal to the gates of the second transistors 829.

In one embodiment, each first shorting bar 841 is coupled to one corresponding test pad 870 via only one end, and each third shorting bar 843 is also coupled to one corresponding test pad 870 via only one end. The second end of the second shorting bar 842 can be coupled to one corresponding bonding pad 865 via one corresponding horizontal transmission line of the horizontal bus 835 instead of the aforementioned vertical transmission line. Alternatively, the second end of the second shorting bar 842 can be coupled directly to one corresponding bonding pad 865. The second end of the fourth shorting bar 844 can be coupled to one corresponding bonding pad 865 via one corresponding vertical transmission line of the vertical bus 855 instead of the aforementioned horizontal transmission line. Alternatively, the second end of the fourth shorting bar 844 can be coupled directly to one corresponding bonding pad 865.

In another embodiment, the second shorting bar 842 can be coupled to the fourth shorting bar 844. That is, both the second shorting bar 842 and the fourth shorting bar 844 can be coupled to one corresponding bonding pad 865 via one corresponding horizontal or vertical transmission line. Alternatively, both the second shorting bar 842 and the fourth shorting bar 844 can be coupled directly to one corresponding bonding pad 865.

While performing the array test or the cell test regarding the flat-panel display device 800, the first test signals and the second test signals are furnished respectively into the corresponding data lines 830 and the corresponding gate lines 850 for checking in advance whether any array wiring defect or any abnormal cell color display exists. That is, in the operation of the array test or the cell test regarding the flat-panel display device 800, the first test signals are furnished into the corresponding data lines 830 via the corresponding test pads 870, the first shorting bars 841, and the first transistors 827 from a plurality of probes. Besides, the first test enable signal is required for enabling the transmission of the first test signals by turning on the first transistors 827 during the array test or the cell test. The first test enable signal is furnished to the gates of the first transistors 827 via one corresponding bonding pad 865, one corresponding vertical transmission line of the vertical bus 855, and the second shorting bar 842. Also, the first test enable signal can be furnished to the gates of the first transistors 827 via one corresponding test pad 870 and the second shorting bar 842 from a probe.

Furthermore, in the operation of the array test or the cell test regarding the flat-panel display device 800, the second test signals are furnished into the corresponding gate lines 850 via the corresponding test pads 870, the third shorting bars 843, and the second transistors 829 from a plurality of probes. Besides, the second test enable signal is required for enabling the transmission of the second test signals by turning on the second transistors 829 during the array test or the cell test. The second test enable signal is furnished to the gates of the second transistors 829 via one corresponding bonding pad 865, one corresponding horizontal transmission line of the horizontal bus 835, and the fourth shorting bar 844. Also, the second test enable signal can be furnished to the gates of the second transistors 829 via one corresponding test pad 870 and the fourth shorting bar 844 from a probe.

When a plurality of source driving ICs and a plurality of gate driving ICs are attached for performing image display operations after finishing the array test and the cell test, the first test enable signal is disabled for turning off the first transistors 827 so as to disable the signal connections between the first shorting bars 841 and the data lines 830. Similarly, the second test enable signal is disabled for turning off the second transistors 829 so as to disable the signal connections between the third shorting bars 843 and the gate lines 850. Accordingly, the flat-panel display device 800 is able to perform image display operations correctly regardless of the existing of the first shorting bars 841 and the third shorting bars 843.

That is, in the fabrication of the flat-panel display device 800, the laser-cutting process for cutting off related connections concerning shorting bars by the laser-cutting machine can be removed, and the particle contamination caused by the laser-cutting process can be avoided for achieving high product yields. Besides, without the requirement of the laser-cutting machine, the production cost of the flat-panel display device 800 can be cut down significantly.

The present invention is by no means limited to the embodiments as described above by referring to the accompanying drawings, which may be modified and altered in a variety of different ways without departing from the scope of the present invention. Thus, it should be understood by those skilled in the art that various modifications, combinations, sub-combinations and alternations might occur depending on design requirements and other factors insofar as they are within the scope of the appended claims or the equivalents thereof.

What is claimed is:

1. A flat-panel display device comprising:
    a substrate comprising a plurality of driving IC mounting areas;
    a plurality of parallel signal lines disposed on the substrate;
    a plurality of transmission lines disposed on the substrate;
    a plurality of shorting bars, each of the shorting bars being disposed on a corresponding driving IC mounting area of the driving IC mounting areas, the shorting bars comprising a plurality of first shorting bars and a plurality of second shorting bars;
    a plurality of first transistors, each of the first transistors being disposed on a corresponding driving IC mounting area of the driving IC mounting areas, the first transistor comprising:
        a first end coupled to a corresponding first shorting bar of the first shorting bars;
        a second end coupled to a corresponding transmission line of the transmission lines; and
        a gate coupled to a corresponding second shorting bar of the second shorting bars; and
    a plurality of second transistors, each of the second transistors being disposed on a corresponding driving IC mounting area of the driving IC mounting areas, the second transistor comprising:
        a first end coupled to a corresponding first shorting bar of the first shorting bars;
        a second end coupled to a corresponding signal line of the signal lines; and
        a gate coupled to a corresponding second shorting bar of the second shorting bars;
    wherein each of the shorting bars is coupled to a corresponding signal line of the signal lines and a corresponding transmission line of the transmission lines.

2. The flat-panel display device of claim 1, wherein the substrate further comprises a bonding area for attaching a flexible printed circuit board, the bonding area comprises a plurality of bonding pads, and at least one of the bonding pads is coupled to a corresponding transmission line of the transmission lines.

3. The flat-panel display device of claim 1, further comprising:
    at least one test pad disposed on the substrate, the test pad being coupled to a corresponding transmission line of the transmission lines.

4. The flat-panel display device of claim 1, wherein the signal lines are a plurality of data lines or a plurality of gate lines.

5. The flat-panel display device of claim 1, wherein the substrate further comprises an outer-lead-bonding (OLB) area, and the transmission lines are disposed on the outer-lead-bonding area of the substrate based on a wiring-on-array (WOA) arrangement.

6. The flat-panel display device of claim 1, further comprising:
    a plurality of third transistors, each of the third transistors being disposed on a corresponding driving IC mounting area of the driving IC mounting areas, the third transistor comprising:
        a first end coupled to the first end of a corresponding first transistor of the first transistors;
        a second end coupled to a corresponding transmission line of the transmission lines; and
        a gate coupled to a corresponding second shorting bar of the second shorting bars.

7. The flat-panel display device of claim 1, wherein the substrate further comprises a bonding area for attaching a flexible printed circuit board, the bonding area comprises a plurality of bonding pads, and at least one of the bonding pads is coupled to a corresponding transmission line of the transmission lines.

8. The flat-panel display device of claim 1, further comprising:
    at least one test pad disposed on the substrate, the test pad being coupled to a corresponding transmission line of the transmission lines.

9. The flat-panel display device of claim 1, wherein the signal lines are a plurality of data lines or a plurality of gate lines.

10. The flat-panel display device of claim 1, wherein the substrate further comprises an outer-lead-bonding area, and the transmission lines are disposed on the outer-lead-bonding area of the substrate based on a wiring-on-array arrangement.

* * * * *